Sept. 18, 1956  J. D. CUMMINGS  2,763,275
COATED PIPE COOLING DEVICE
Filed March 22, 1954  2 Sheets-Sheet 1
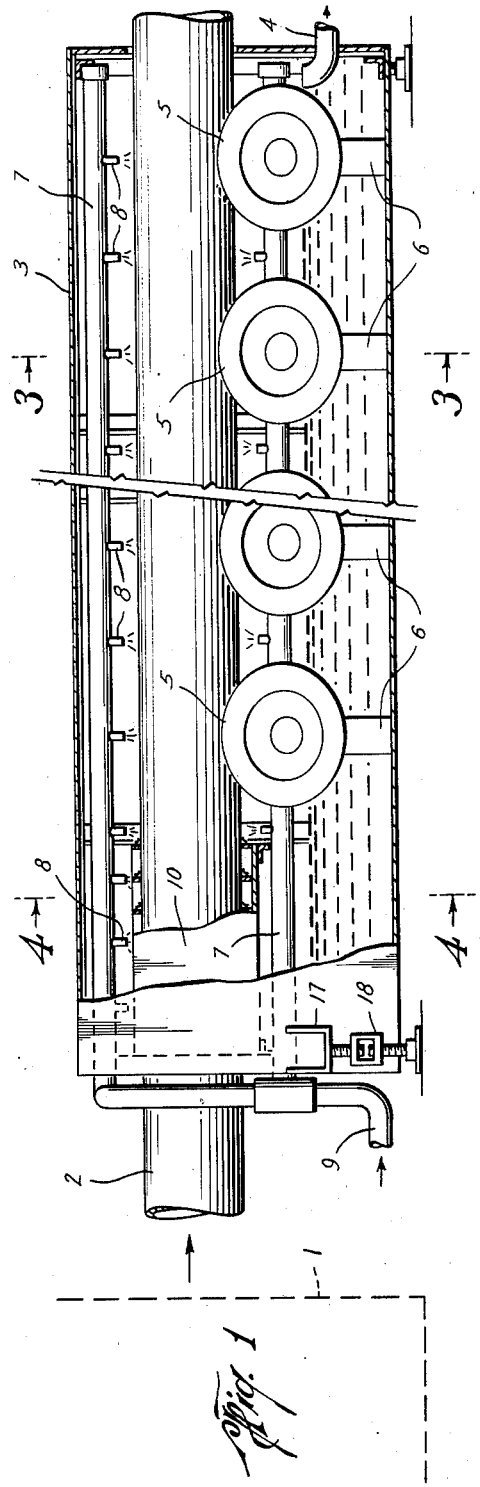
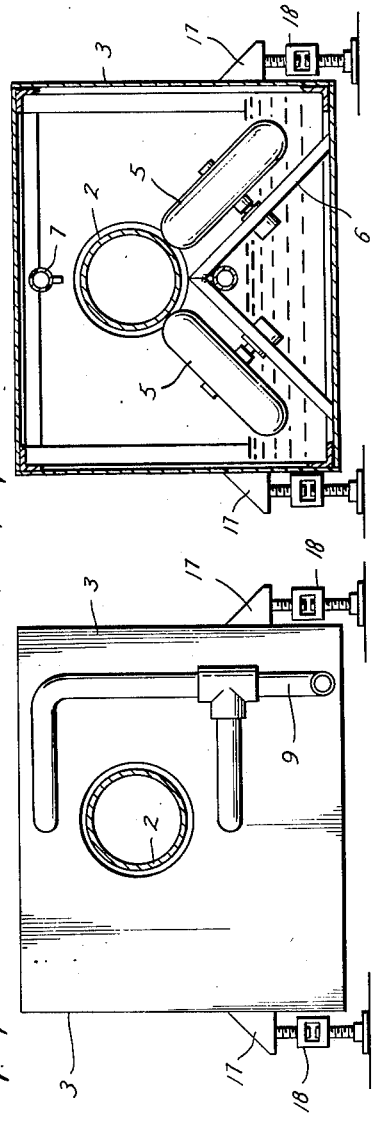
James D. Cummings
INVENTOR.
BY
G. C. Helmig
ATTORNEY

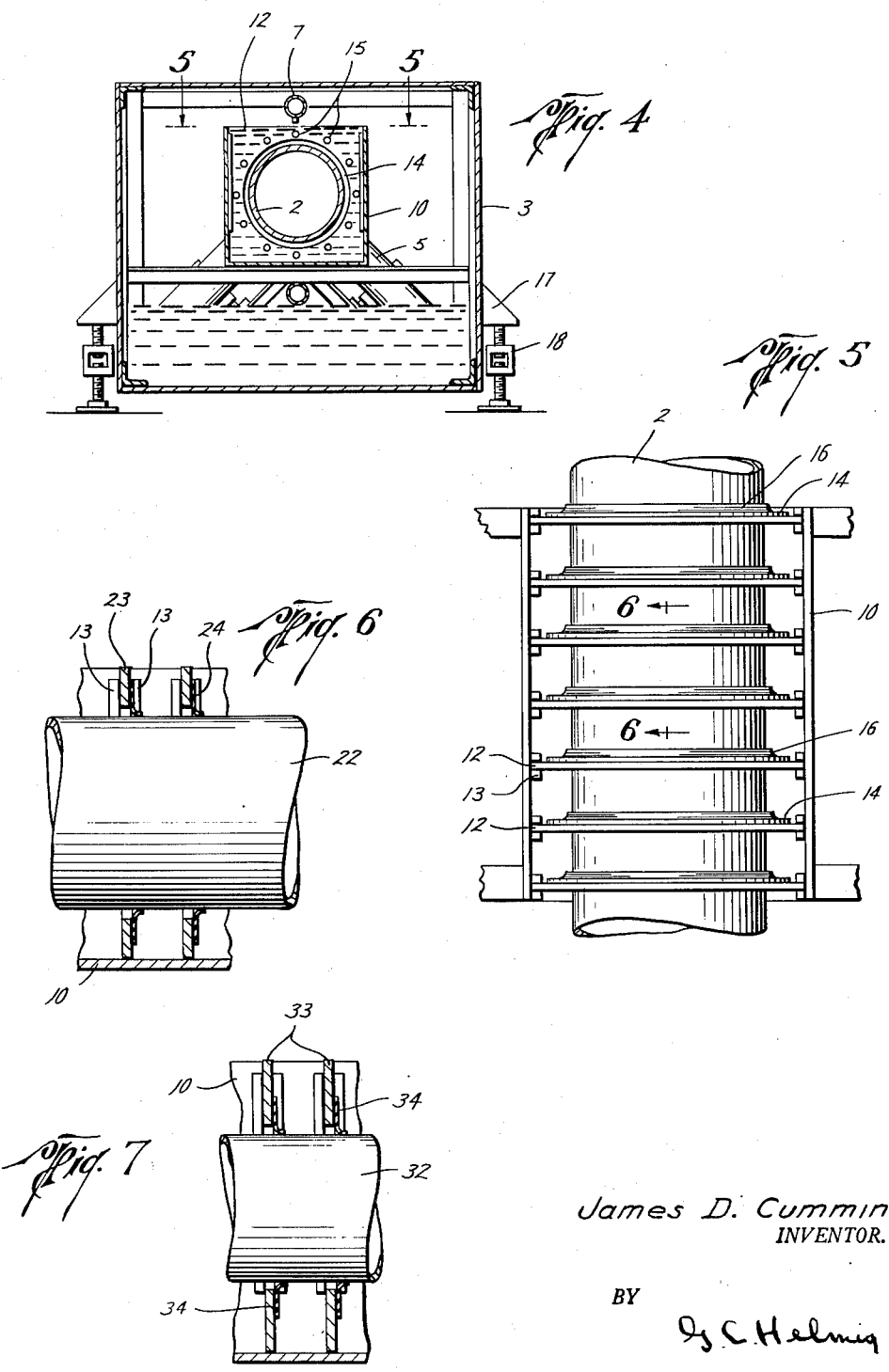

United States Patent Office 2,763,275
Patented Sept. 18, 1956

2,763,275

COATED PIPE COOLING DEVICE

James D. Cummings, Houston, Tex., assignor to Crutcher-Rolfs-Cummings, Inc., Houston, Tex., a corporation of Texas Application March 22, 1954, Serial No. 417,706

6 Claims. (Cl. 134—105)

This invention relates to an improved arrangement for cooling hot coated pipes or the like and for supporting a traveling hot coated article through its soft coating layer while still warm in a manner to minimize dents and surface irregularities while its temperature is being reduced to that at which the coating material begins to harden and is set up enough so that it no longer is readily impressible. The present disclosure is related to that contained in my pending patent application Serial No. 388,305, filed October 26, 1953.

To reduce corrosion, it is customary to coat pipe lines such as are used for the transportation of oil and gas with a protective layer of an asphalt or tar substance, and machines are employed to flow a hot coat on the pipe and immediately helically wrap a paper around the hot plastic material, which then sets or hardens as it loses heat. Particularly with yard equipment having stationary treating machines through which pipe sections run in continuous end to end succession, it is important that heat be removed from the coating quickly for an immediate setup, since the weight of the pipe is transmitted through the coating to the conveyor mechanism. A soft coating under load concentration applied in regional segments of pipe circumference will be squeezed locally and shifted, and consequently the coating layer sets up with surface depressions and ridges, which means the thickness of the protective layer is uneven and too thin in the squeezed regions to yield the proper protection to the overlaid metal surface.

An object of this invention is to provide for a cooling and supporting arrangement immediate the hot application treatment machine whereby the wrapped hot coating is quickly subjected to a sudden and large temperature drop for a rapid hardening setup at the surface as the traveling pipe passes through a grouped succession of juxtaposed elastic load carrying rings, each having wiping contact throughout the entire coated pipe circumference to avoid regional load concentration and to promote desired coating surface smoothness and uniformity of coating thickness. The load carrying rings are preferably of rubber or other suitable nonmetallic, elastic, deformable material with an aperture to closely fit or to be slightly smaller than the coated pipe diameter so as to stretch radially outwardly around the coated pipe and also bend along its inner annular edge in the direction of pipe travel as an elastic annular lip or supporting flap for a circular squeegee wiping and bearing engagement. The group of pipe supporting rings thus exert an inward annular pressure around the entire pipe circumference and float the load of the traveling pipe with an approach to uniformity of stress in all radial directions. These load transferring wipers co-operate with and form parts of a cooling liquid containing tank through which the pipe travels submerged within the liquid body for a direct heat exchange contact with the coated pipe surface. To some minor extent the body of liquid will tend to exert a lifting buoyant force and a uniform pressure inwardly against the pipe surface within the tank as an aid to the squeegee load spread. With rapid heat dissipation in a short range of pipe travel, the surface hardening of the coating will have proceeded sufficiently to enable the coated pipe to rest and roll on rotating conveyor wheels without distortion and to be spray flooded with additional cooling liquid for a distance beyond the submerging tank for further heat absorption, and thereafter to reach surrounding air temperature without the likelihood of coating damage during the usual handling operations after the pipe leaves the coating machine.

A further object of the invention is to provide a traveling pipe receiving tank with open ends to be closed by transverse plates carrying the squeegee pipe bearing rings, such plates being removably mounted and arranged in sets having various sizes of ring aperture diameters to replace one another within the tank for the accommodation of pipes of various diameters.

Other objects and advantages will become apparent during the course of the following specification having reference to the accompanying drawings, wherein Figure 1 is a longitudinal vertical sectional view with parts in elevation, of the cooling machine; Fig. 2 is an end elevation at the pipe entrance wall of the machine; Figs. 3 and 4 are transverse sections on lines 3—3 and 4—4, respectively, of Fig. 1; Fig. 5 is a top plan view of the squeegee support and cooling tank as viewed in the direction of the arrows of line 5—5 of Fig. 4; and Figs. 6 and 7 are similar fragmentary sections illustrating the interchangeability of mounting plates for pipes of different diameters.

In the drawing a pipe coating and wrapping machine is diagrammatically indicated by broken lines at 1. Immediately beyond the discharge side of the coating machine 1 the coated pipe sections 2 are propelled forwardly in end to end succession by the coating machine drive mechanism, and pass through the cooling machine. This machine includes a walled enclosure 3 which confines the water or other cooling liquid employed to wash over and absorb heat from the coated pipe. The bottom of the enclosure forms a well for the collection of the heat laden cooling medium which is to be either discharged as waste or recirculated according to the availability of supply. A standpipe outlet 4 is illustrated in Fig. 1 for maintaining a desired liquid level within the well. That level preferably is slightly above the bottoms of the pipe supporting treads of a series of conveyor wheels or rollers 5, to eliminate excess heat in the treads.

The drawings show the wheels 5 just ahead of the exit end of the machine arranged on inclined axes on opposite sides of the center line of the pipe 2. For convenience the wheels 5 are conventional pneumatic tired automobile wheels, and they are arranged in pairs supported by A-frames 6 so that the wheels of each pair are in upwardly converging planes and their treads afford pipe receiving valleys which can be adjusted in width to fit pipe diameters by relative adjustment of wheel hubs and supporting axles on the A-frames 6.

Above and below the traveling pipe 2 are cooling liquid supply manifolds 7—7 having a series of spray heads 8—8 for directing cooling liquid on the coated pipe. These manifolds 7—7 are joined to a delivery pipe 9 leading from the outlet of a liquid pressure source, such as a pump, which can be drive connected with the power plant for the coating machine 1.

Ahead of the pipe supporting wheels and immediately adjacent the entrance to the cooling machine is a tank through which the pipe travels completely submerged in cooling liquid. This tank, as its main body, is a three-walled sheet metal channel 10 having open ends and an open top, with its channel extending axially of the direction of pipe travel. It locates a succession of longitudinally spaced and transversely disposed removable plates 12 which are centrally apertured to receive the pipe. As shown in the drawing, they are assembled and removed from the tank body 10 through the open top and are located along opposite edges by guideways or slots which conveniently are afforded by pairs of bars 13 with the bars of each pair spaced apart a distance approximating the thickness of the wall plates or transverse partitions 12. These vertical guide straps are preferably welded to the opposite side walls of the body 10. Rings 14 of rubber or other similar material are secured to the plates by vulcanization or by a series of rivets 15 so as to extend inwardly of the edges of the plate apertures. The several rings have their central openings in axial alignment with one another and the axis of the pipe, and their internal diameter is preferably slightly less than the external diameter of the coated pipe, so that as the pipe passes through the rings the rings are spread and are deflected to form axial circular lips 16 which wipe the coated pipe periphery and closely hug the surface throughout the entire circumferential extent. The pipe is therefore centered by the elastic rings, and its weight is transferred into the metal plates 12, which bottom on the lower wall of the channel 10 for carrying the weight of the pipe without localization of the load in any circumferential region.

Fixed support bars mount the squeegee tank within the main water tank 3, which has riveted or welded on its side walls a number of mounting brackets 17 for engagement with adjustable turnbuckles or jacks 18 resting on the ground. Jack adjustment enables the water tank 3 to be leveled and the squeegee tank to be aligned with the axis of the traveling pipe.

In addition to supporting the coated pipe, the partition plates 12 and the elastic rings 14 in co-operation with the pipe close the ends of the open channel 10 and subdivide the interior space into a number of chambers to be filled with cooling liquid. Any suitable means for supplying liquid to the tank may be employed, and for convenience the uppermost spray manifold 7 is shown in the drawing as including spray heads 8 directly above the open top of the tank to deliver cooling water to the tank. The volume of delivery should be in excess quantity and considerably more than that liquid which may escape along the surface of the pipe passing through the tank so that there is a constant overflow at the top edge of the tank. This will insure that the liquid level is always higher than the top of the pipe 2, so that the entire coating is completely flooded with cooling water for the absorption by direct contact of a maximum of heat from the coating. To some extent, the body of water presses all the way around on the surface of the pipe and lends a bit of support for carrying the weight of the pipe into the tank walls. The water also lubricates the wiping surfaces and keeps the rubber cool, to prolong its useful life.

Figs. 6 and 7 show pipes 22 and 32 of two different diameters, and the use of supporting plates 23 and 33 with correspondingly sized central apertures for carrying circular squeegee rings 24 and 34 of proper size to wipe the surfaces of the pipes and exert an elastic force entirely around the pipe for its suspension coincident with its forward travel.

While only a specific embodiment of the invention has been described, it will be understood that such modifications may be made as come within the scope of the appended claims.

What is claimed is:

1. For cooling and hardening a hot applied plastic coating on a pipe traveling axially, a machine extending longitudinally of the direction of pipe travel for passage of pipe therethrough, including a bottom liquid collecting well, longitudinally spaced pipe engaging supports above the well for bearing the traveling pipe through its surface coating, said supports in the pipe entry region where the coating is the hottest and most plastic, comprising a cooling liquid containing tank having a longitudinal succession of nonmetallic, elastic, deformable rings forming parts of transverse tank partitions for close sliding fit engagement with the traveling pipe surface coating throughout its entire circumference, said rings co-operating with the pipe surface in supporting the same and sealing the tank to maintain tank liquid level above the pipe and the liquid in direct heat exchange submersion contact with the hot coating and in buoyant support of the pipe, other supports beyond the initial cooling tank support comprising a series of wheels furnishing pipe rolling contact, and a cooling liquid supply system delivering liquid to the cooling tank and having spray heads along the length of the well to spray flood additional cooling liquid on pipe coating following its exit from and initial submersion cooling in said tank.

2. Equipment to extract heat from a thick semifluid layer of pitch immediately following its hot application as a coating wall to a pipe surface and to support said pipe through the transference of load through the hot applied pitch and to provide bearing support engagement on the cooled coating wall after heat extraction occurs for minimizing extrusion displacement of the thick wall through load concentration thereon, said equipment comprising a cooling liquid containing tank positioned immediately adjacent the point of hot coating application and arranged for submergence in the tank contained cooling liquid of the hot wall layer for solidification thereof during relative travel of the pipe and the tank, supporting means immediately beyond the tank bearing on the cooled solidifying pitch wall and a close succession of pipe embracing flexible rings carried in said tank with the first and final rings at the tank entrance and exhaust ends respectively and the remaining rings at intervals therebetween, said succession of rings co-operating each with the others to provide at closely spaced intervals throughout the length of the tank a multiplicity of spaced and narrow load bearing circular line slide contacts on the coating wall and serving to carry and distribute the load among them and continuously around the circumference of the coating wall at each ring.

3. For the solidifying treatment of a hot semifluid thick layer of coating pitch or the like sheathed on a pipe and coincidentally transferring load through the semifluid coating with minimum load concentration thereon, means for solidifying said thick layer by heat extraction from the semi-fluid coating layer and for the transference therethrough of weight between the coated pipe and a cooling tank receiving the hot coated pipe and during relative travel of the hot coated pipe and tank, including a channel-shaped tank having side and bottom walls for receiving a hot coated pipe immediate the application thereon of a hot semifluid thick coating layer, a series of axially spaced and transversely projected partitions engaging the tank walls and being located with the first of said partitions at the tank entrance and with the rest of the partitions continuing thereafter in spaced apart succession rearwardly from the first partition and each partition having a centrally apertured pipe receiving flexible ring for snug load bearing engagement throughout the circumferential extent of the exterior surface of the thick coating layer as the coated pipe passes therethrough and which succession of load bearing rings distributes among the partitions the transferred load and co-operates in subdividing said tank into a succession of separate liquid compartments, and means to supply cooling liquid to the several compartments and maintain the compartments filled with cooling liquid to a level above the pipe coating and in heat absorption contact with the coating immersed therein for coating solidification.

4. For the rapid solidification and maintenance of thickness uniformity of a hot semifluid layer applied on a pipe surface as a thick coating and for the transference of heat through the semifluid layer as it is being cooled, a cooling liquid containing tank for the reception and relative travel therethrough of the hot coated pipe immediate the application thereto of the hot layer, a close succession of fixedly located load transferring supports within the tank with the endmost of said supports constituting the entrance and the exit ends of the tank and the remaining supports being spaced apart in the direction of the pipe axis and all of said supports having apertured flexible load carrying narrow rings receiving the coated pipe and snugly circumferentially embracing the outer surface of said thick layer in but momentary bearing therewith at any instant during relative travel for the transference radially through said coating layer of load between the pipe and the tank, and said tank serving to contain heat absorbing liquid in submerison contact with said layer surface during its travel through the cooling tank.

5. For use with pipe coating equipment operable on pipe traveling axially, a cooling unit including a water tank for passage therethrough of a traveling coated pipe, a multiple squeegee support for the pipe adjacent the pipe entrance end of the tank, closed bottom and side walls fixed in the tank in co-operation with the multiple squeegee support in containing cooling water to submerge the pipe, pipe conveyor wheels rotatably mounted in the tank for rolling support engagement of the pipe beyond said multiple squeegee support, and adjustable jack mountings for the tank for aligning the tank mounted pipe supports with the axial path of the pipe travel.

6. In a coated pipe cooling device, a cooling liquid containing tank for the axial passage therethrough of a traveling pipe, a series of elastic, deformable squeegees mounted by the tank in axial spaced relation to embrace and support the traveling pipe during its passage through the tank in heat exchange relation to the cooling liquid, a series of pipe supporting rollers beyond the tank, and cooling liquid sprayers to direct additional cooling liquid on the traveling pipe supported by said rollers.

References Cited in the file of this patent

UNITED STATES PATENTS

| | | |
|---|---|---|
| 1,957,792 | McManis | May 8, 1934 |
| 2,212,588 | Csanyi | Aug. 27, 1940 |
| 2,287,825 | Postlewaite | June 30, 1942 |
| 2,336,533 | Dilworth | Dec. 14, 1943 |
| 2,522,071 | Tait | Sept. 12, 1950 |
| 2,565,855 | Jordan | Aug. 28, 1951 |
| 2,579,098 | Scofield | Dec. 18, 1951 |